Oct. 25, 1960 D. E. HULL 2,957,989
METHOD FOR TRACING SEPARATION PROCESSES
Filed Feb. 3, 1958
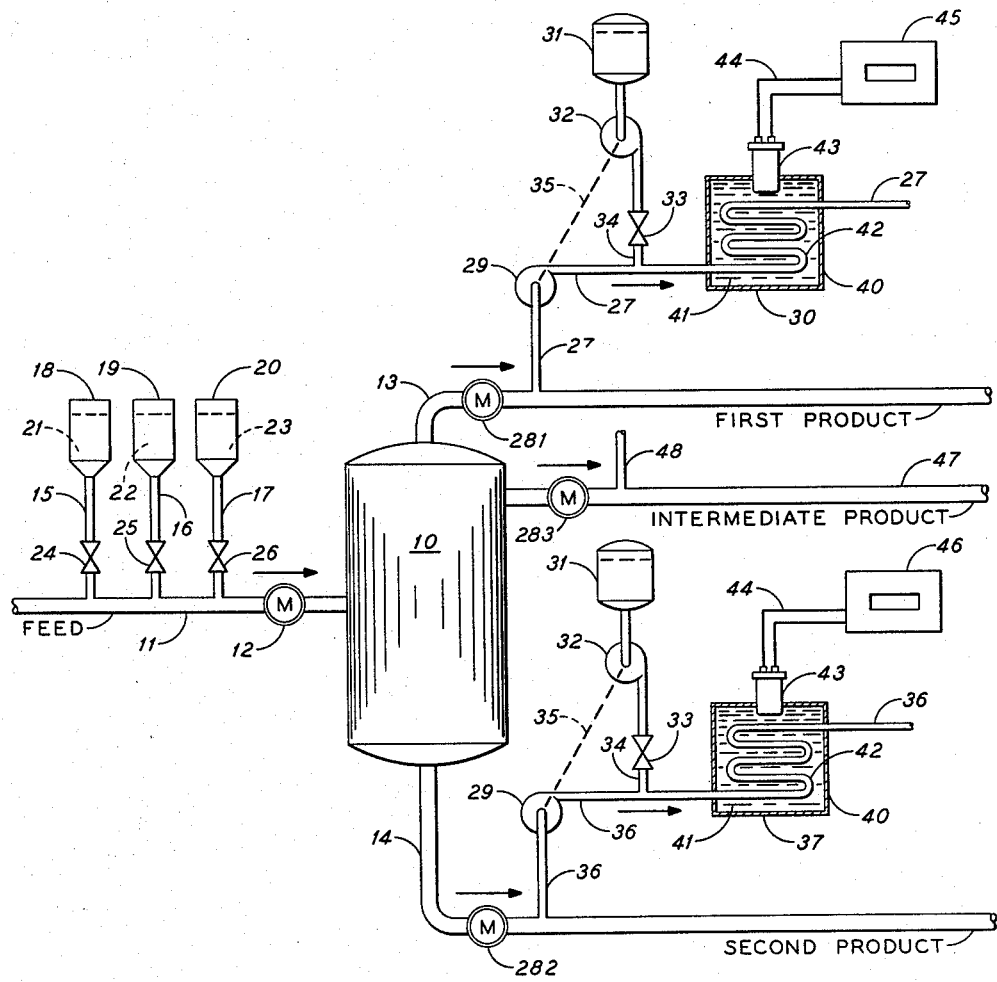
INVENTOR
DONALD E. HULL
BY
ATTORNEYS United States Patent Office 2,957,989
Patented Oct. 25, 1960

2,957,989
METHOD FOR TRACING SEPARATION PROCESSES
Donald E. Hull, San Rafael, Calif., assignor to California Research Corporation, San Francisco, Calif., a corporation of Delaware
Filed Feb. 3, 1958, Ser. No. 712,950
12 Claims. (Cl. 250—71.5)

This invention relates to methods for tracing a predetermined component in a compound or a mixture with other components through a separation process which may involve fractional distillation, solvent extraction, crystallization, reaction with a modifying agent such as an acid, or other separation techniques. It is particularly concerned with the steps of introducing a known quantity of a radioisotope in a compound or material which is isotopic with the predetermined component to be traced, and after separation into a plurality of streams or products, introducing into each stream a miscible or soluble scintillation material to produce pulses which are detected and integrated to give a quantitative indication of the presence of that component.

This application is a continuation-in-part of my co-pending application, Serial No. 465,602, filed October 29, 1954, entitled "Fluid Flow Measurement," which issued March 11, 1958, as Patent No. 2,826,699.

The disclosure of that case is incorporated herein by reference and will be reviewed briefly below.

The principle upon which the present invention is based is derived from the flow measurement procedure of the above-mentioned application, which may be characterized as requiring the step of injecting a known small quantity of a radioactive fluid into the flowing stream to be measured and monitoring the stream to obtain a time-integral value of the effect of the radioactivity during its passage or transit by a given point.

This may be done by means of a single detector unit, for example, a Geiger tube or scintillometer, which is placed in the stream or adjacent the pipe wall at any convenient downstream location. The total radioactivity, A, of the injected fluid is known, for example, one millicurie, and the total counts, N, detected from the radioactive material passing the single detecting point are measured by a suitable counting and totalizing meter. If the flow rate in absolute units is required, for example, gallons per minute, a calibration may be made on a short length of an equivalent conduit or confined fluid passage containing a known concentration of radioactive material with an equivalent detector arrangement to obtain a response characteristic or proportionality factor F which may be expressed, for example, as counts per minute from one millicurie of radioactive material per gallon of fluid. The flow rate to be determined is then found by the equation:

$$V = \frac{FA}{N} \quad (1)$$

where V=flow rate, gallons per minute, A=quantity of radioactivity added in millicuries, N=net total counts during passage of quantity A, which may be done by computation, or the use of an appropriate chart or nomograph or by automatic electrical equipment. In the determination of the total counts N, the background count due to natural radioactivity, cosmic rays, etc., is subtracted from the indicated value, as is conventional in such measurements in this art.

If only relative flow rates are needed, the specific value of the response characteristic or proportionality factor F may not be required, as it is quite feasible to standardize upon the quantity of radioactive material to be injected under different or varying rates of flow, the latter being determinable upon the basis of $$V \propto \frac{A}{N} \quad (2)$$

wherein the terms V, A and N are the same as given above, in appropriate units.

Also, if one flow rate is known under such conditions, the others may readily be determinable as absolute values, i.e., in quantities per unit time.

The following discussion outlines, in more detail the mathematical basis for this improved measuring procedure, which has been amply proved by field utilization.

This method is based upon the principle of integrating the response of a detector of radioactivity, for example, a Geiger or scintillation counter, while a definite quantity of a radioactive isotope tracer having known properties flows in a segment of the fluid through the pipe or passage with which the single detector is associated. The number of counts so recorded, after subtracting the background, is independent of the way in which the concentration of tracer varies along the pipe, but is inversely proportional to the velocity at which the tracer flows past the detection point. The number of counts registered by the detecting and indicating equipment, does depend upon the pipe dimensions and the placement of the detector units with respect to the fluid stream and the passage through which it moves.

A proportionality factor or response characteristic for a given size, material, and type of pipe may be determined by filling short section of the same or equivalent pipe with a fluid containing a known concentration of the specific radioactive isotope and noting the counting rate of the detector, also placed in a comparable position to that of the field use. The factor F, which represents counts per unit time registered from a unit of radioactivity per unit volume, as, for example, counts per minute from one microcurie per gallon, may be used in the above-mentioned equation to calculate absolute values of flow rates, as is shown by the following discussion.

Let N be the integral number of counts and R be the instantaneous counting rate, both corrected for background. Then over the duration of the passage of the tracer:

$$N = \int R \, dt \quad (3)$$

Now R is proportional to the continually varying concentration C of the tracer. The proportionality constant is the factor F, determined by calibration for a given pipe and detector geometry.

$$R = FC \quad (4)$$

Substituting, $$N = F \int C \, dt \quad (5)$$

Let V be the flow rate in gallons per minute. Then $dq$, the increment of volume passing during the interval $dt$, is $$dq = V \, dt \quad (6)$$

Again substituting:

$$N = \frac{F}{V} \int C \, dq \quad (7)$$

But the integral of radioisotope concentration over the total volume is simply the total quantity A of radio-tracer, expressed in appropriate units, e.g., millicuries.

$$\int C \, dq = A \quad (8)$$

Hence, $$N = \frac{FA}{V} \quad (9)$$

Solving for flow rate, $$V = \frac{FA}{N} \quad (10)$$

Assuming that F has been determined for a given isotope in a given pipe, the experimental measurement of the quantity of isotope injected A and of the number of counts recorded N gives the necessary data for calculating V.

This invention is specifically concerned with a novel modification of the foregoing procedure to determine the proportions of a given or predetermined component in two or more streams or products from a separation process. It may be charcterized briefly by requiring the steps of flowing the initial stream at a constant known rate into the separation zone and introducing a finite quantity of a radioactive compound which is isotopic with the component to be determined. For example, if hydrocarbons are involved, the isotopic compound may contain either carbon-14 or hydrogen-3 as the radioactive tracer. This tracer produces a radioactive segment in the flowing stream which will be divided in the separation zone in exactly the same proportions that the predetermined component is divided.

Both carbon-14 and hydrogen-3 emit only soft beta-rays so that their subsequent detection is relatively difficult. As an example of how this detection may be improved, it is proposed, under certain conditions, to add to all or part of each of the separated product streams a scintillation liquid such as terphenyl, at a known constant rate to mix with the radioactive segment and produce light pulses or photons which may be detected in a counting cell by means such as a photocell. The total count of these light pulses due to the transit of the radioactive segments is obtained by means of an integrating scaler and is utilized, as will be explained below, to determine the respective proportions of the injected tracer, for example, radioactive carbon or hydrogen, which appears in each of the separated streams. Where other tracers, particularly those emitting hard gamma radiation such as cobalt-60 or cesium-134, are used, the activating step and the equipment therefor may be omitted, and a suitable detector such as a G-M tube may be utilized.

By the nature of radioactivity monitoring, as will be understood from this disclosure by those familiar with this art, it is not necessary to pass the entire flow of either of the several streams from the separator through or past a detector. Thus, a small sample stream diverted from either of the several product streams will contain a representative quantity of the radioactive segment flowing in the product stream and will give an accurate indication of the division that has taken place in the separation zone. This will be more fully set forth below, in the detailed explanation of an example of the practice of the invention.

Examples of practical applications of this procedure are the distillation of a mixture of paraxylene, metaxylene and orthoxylene, any of which components can be traced with hydrogen-3 or carbon-14 in a distillation process in which the desired component is recovered in the overhead stream. If, for example, there is 20% orthoxylene in the feed to the column which is enriched to about 90% in the residuum and reduced to 10% in the overhead vapors, the process involves periodic injections of radioactive orthoxylene into the feed to the column followed by the diversion of a sample stream from the overhead stream, the addition of the scintillation liquid, e.g., terphenyl, and the subsequent integration of the total counts from the sample stream.

Another example is the determination of efficiency of the separation of paraxylene from ethylbenzene by distillation.

In the production of phenol, acetic acid is present in the feed and its distribution to the several products from the still may be determined by use of a suitably radioactive tracer of acetic acid.

In the crystallization of paraxylene from metaxylene at about −95° F., radioactive metaxylene may be introduced in the feed and the purified and remelted paraxylene component is mixed with a known amount of scintillation liquid and monitored with a photocell to control the conditions of the original crystallization procedure.

Another example is the determination of the rate of hydrolysis of the sulfonic acids in xylene purification. Metaxylene hydrolyzes faster than orthoxylene and the last-named component may be traced with carbon-14, which permits the control of the acid feed to the hydrolysis operation.

It is an object of this invention to provide an improved method for tracing a specific component of a compound or a mixture with other components through a separation process.

Another object is to provide a method of this nature which utilizes radioactive isotopes in such small concentrations and amounts that they may be handled safely without expensive and time-consuming precautions.

Another object is to provide a method of tracing one or more of a plurality of specific elements through a process wherein they may be separated in varying proportions.

Another object is to provide a sampling procedure for a stream of liquid containing a representative quantity of a radioactive isotope that involves only the monitoring of a small part of the main stream which is to be analyzed for a desired component.

These and other objects and advantages will be further apparent from the attached specification and drawing, which describes and illustrates an example of the invention as applied to a hydrocarbon separation process.

The drawing is a flow diagram representing the application of this invention to a separating system having a single inlet or feed stream and two or more product outlet streams, each of which outlet streams is to be analyzed for a specific component in the feed.

In the drawing, reference number 10 designates a separator, which may be a fractionating column, still, extractor, or the like, into which the feed material, for example, a liquid mixture containing ortho- and paraxylene, flows at a constant rate from a supply source (not shown) through inlet conduit 11 and total feed meter M–12. An outlet conduit 13 leads from the upper end of separator 10 to convey the overhead (first) product to any desired equipment (not shown) for storage or further treatment. A bottoms or residuum outlet conduit 14 leads from the lower part of separator 10 to convey the bottoms (second) product to any desired equipment (not shown) for further treatment or disposal.

Connected to inlet conduit 11 by pipes 15, 16 and 17 are one or more gas-pressurized containers 18, 19 and 20, each adapted to contain in solution in a liquid a known amount of a radioactive tracer which is isotopic with one of the components or constituents of the feed material, so that, as the separator divides the tracered component of the feed into two principal streams, in this example, ortho- and paraxylene, the radioactive tracer will divide in the same proportions. Where a ternary composition is involved, for example, ortho-, meta-, and paraxylene, three tracer liquids 21, 22 and 23 may be selectively retained in containers 18, 19 and 20, and separately released by valves 24, 25 and 26 to enter the inlet conduit 11 to form a radioactive segment of the total feed liquid flowing therein.

The nature of the radioactive tracer will depend upon the liquid feed and the components thereof that are to be determined after they have passed through the separator 10 to outlet conduits 13 and 14. For example, if liquid hydrocarbons are involved, isotopes comprising carbon-14 and hydrogen-3 are suitable, provided the ultimate detecting and counting equipment, to be described below, are sufficiently sensitive. The nature and characteristics of these tracer materials are well known to one skilled in the art of radioactivity measurements and need not be outlined in detail here.

As stated above, the relatively soft beta-emitting radioisotopes hydrogen-3 and carbon-14 are difficult to detect, but if a suitable counting cell is used they afford advantages not shared by other tracer materials. Because it is usually neither necessary nor economical to monitor the radioactive segment of all of either the first or second product streams in conduits 13 and 14, a small representative sample of each is diverted through appropriate radioactivity counting equipment. For the product stream in conduit 13, in this example, a branch connection or conduit 27 beyond flow meter M–281 conveys a first product sample at a constant rate through pump 29 to a sensitive counting cell generally designated 30. To make this diverted or sample stream capable of being counted by this specific form of cell, details of which will be described later, the stream in conduit 27 is first activated by introducing into it, at a constant rate, a scintillation liquid, for example, terphenyl, from storage container 31 through a pump 32 and valve 33 in branch conduit 34. Desirably, but not necessarily, the product sample pump 29 and scintillation liquid feed pump 32 are connected to a common shaft 35 and are so driven or geared that the two liquids flow at a constant rate and in a predetermined proportion. Other means for maintaining this last-named relation could equally well be substituted. It is necessary, however, that both of these streams flow at a constant rate while the radioactive segment of the overhead product stream in 13 is being monitored. It is also necessary that the rate of flow of the entire first product stream in conduit 13 shall be known, as by meter M—281.

An identical arrangement to that just described for the first product stream in conduit 13 is also provided for passing a representative sample from the second or bottoms product stream in conduit 14 through a branch connection 36 and counter cell 37. The associated equipment, meter, pumps, etc., are the same for each, and the second product flow rate is known from meter M-282. Thus, for only two product streams, the sum of M—281 and M-282 equals the total feed indicated by M-12.

The counting cells 30 and 37 may be of identical construction, and in this example consist of a suitable outer container 40 of opaque material filled with a transparent liquid 41, which may also serve to hold the photocell at a uniform temperature, and traversed by a coiled or convoluted transparent coil 42 through which the sample product stream passes from conduit 27 or 36. On one or more sides of container 40 one or more photocells 43 receive the light photons or scintillations which result from the interaction of the radioactive tracer material and the scintillation liquid in the flowing sample stream. Appropriate electrical leads 44 connect photocells 43 to conventional scalers and integrators 45 and 46, which will accumulate counts from the passage of that portion of the radioactive segment which is formed in conduit 11, separated in zone 10, passed through metered product outlet 13 or 14, and sampled through conduits 27 and 36, respectively.

As was pointed out in my copending application, Serial No. 465,602, now Patent No. 2,826,699, it is not necessary to pass all of the product stream in conduits 13 or 14 through the counting cells 30 and 37. If only a portion of each stream is diverted, as through conduits 27 and 36, the response of the counting cells 30 or 37 will still be an accurate indication of the fraction of the desired component of the originally introduced feed and radioactivity that has been separated by separator 10. Under such circumstances, that portion of the segment of stream 13, for example, containing the separated quantity of originally introduced radioactivity and flowing through sampling conduit 27 and counting cell 30, is moving at a slower rate than if all the stream in 13 passed through the cell, due to that portion of the product stream that is still flowing through conduit 13. The longer time required for the diverted part of the segment to flow through counting cell 30 gives an increased total count due to its longer residence in the cell that exactly counteracts the effect of the reduced amount of radioactivity, so that the totalized or integrated net counts detected by photocell 43 will be exactly the same as if all the liquid in conduit 13 had passed through cell 30.

It will be understood from the disclosure of my copending application, Serial No. 465,602, now Patent No. 2,826,699, the essential part of which is quoted above, that the "net total count" N (above background) of the radioactivity detected and integrated by the passage of the sample of the radioactive segment through either counting cell is inversely proportional to the flow rate V and directly proportional to the response characteristic F of the counter cell and to the quantity A of radioactivity passing through the counter. In other words, $$N = \frac{FA}{V} \qquad (10)$$

This invention utilizes the same basic relationship, but in a different sequence of steps and for a specifically different purpose. In the example given herein the quantity of originally introduced radioactivity A is known from the amount of radioisotope added, but the separator 10 divides it as well as the component of the mixture to be determined, in unknown proportions $A_1$ and $A_2$. The flow meters M-281 and M-282 indicate the fluid flow rates $V_1$ and $V_2$, expressed in appropriate units, of the product sample stream in each of conduits 13 and 14, so that the following relationship applies to each of the two separated product streams:

$$A = \frac{VN}{F} \qquad (11)$$

where A=quantity of radioactivity and hence is representative of the quantity of the desired component to be determined in the stream, V=flow rate—from meter M-281 in conduit 13 and M-282 in conduit 14, N=total net counts—from cell 30 or 37, after deducting background, and F=response characteristic of cell 30 or 37, determined as outlined above. Because the introduced radioactivity A has been separated into $A_1$ and $A_2$ in the same proportions as the predetermined component P of the feed stream through conduit 11, the results of that separation can be accurately determined from this expressed relation for each product stream by the equations:

$$\frac{A_1}{A_2} = \frac{P_1}{P_2} \qquad (12)$$

and $$\frac{P_1}{P_2} = \frac{\frac{V_1 N_1}{F_1}}{\frac{V_2 N_2}{F_2}} \qquad (13)$$

where $P_1$=amount of predetermined component in the first stream, and $P_2$=amount of predetermined component in the second stream.

Thus, for the general case, if there are a plurality of separated product streams 1, 2, 3, 4—containing unknown proportions $P_1$, $P_2$, $P_3$, $P_4$—of the predetermined component to be determined, all of which add up to or total the whole of that component in the initial feed to the separator 10, and to which the quantity A of radioactive tracer has been added, the equation for any given stream would be:

$$P_1 = \frac{V_1 N_1}{F_1 A} \quad (14)$$

$$P_2 = \frac{V_2 N_2}{F_2 A} \quad (15)$$

$$P_3 = \frac{V_3 N_3}{F_3 A} \text{ - - etc.} \quad (16)$$

If the response characteristics F of the counting cells 30 and 37 are adjusted to be equal, so that $F_1 = F_2$, the relationship expressed in Equation 13, above, can be simplified to:

$$\frac{P_1}{P_2} = \frac{V_1 N_1}{V_2 N_2} \quad (17)$$

This may conveniently be defined as detecting the samples of the radioactive segments of the first and second streams under comparable monitoring conditions.

To illustrate how an intermediate stream or product may be separated from zone 10, there is shown an intermediate product line 47, with a meter M-283 to give the total flow rate of that stream. Branch connection 48 leads from line 47 to a pump counting cell, etc. arrangement similar to those described and illustrated for the first and second product lines 13 and 14, respectively.

In addition to the specific arrangements shown herein, it is obvious that further modifications and changes in apparatus and procedure could be made without departing from the essential features of the invention. Accordingly, it is intended that all such that are within the scope of the appended claims are intended to be embraced thereby.

I claim:

1. A method of determining the distribution of a component of a mixture or compound between a plurality of streams from a process zone, comprising the steps of introducing into said zone with said mixture or compound a finite quantity of a radioactive material which is isotopic with said component, separating said mixture into at least a first stream and a second stream, each containing a radioactive segment proportional to the amount of said component therein, measuring the flow rate of one of said streams, introducing an activating material into said stream at a known constant rate of flow, detecting pulses in at least a part of said stream due to the interaction of said radioactive segment and said activating agent, integrating said pulses and determining the proportion of said component in said stream according to the equation:

$$P = \frac{V_1 N_1}{F_1 A}$$

where $V_1$ = quantity flowing in the stream per unit time
$N_1$ = integrated detector response—net total counts
$F_1$ = detector characteristic, counts per unit time for a given concentration of radioactivity in the stream
P = fraction of component in stream measured
A = total quantity of radioactivity added to mixture or compound passing to separation zone.

2. A method of determining the distribution of a component of a mixture or compound between a plurality of streams from a process zone, comprising the steps of introducing into said zone with said mixture or compound a specific quantity of a radioactive material which is isotopic with said component, separating said processed mixture into a plurality of streams, each containing a radioactive segment proportional to the amount of said component therein, measuring the flow rate of one of said streams, determining the response characteristic of a radiation detector to a known concentration of radioactivity in said last-named stream, and determining the proportion of said component in said stream by integrating the response of said detector to the transit of at least a part of said stream.

3. A method according to claim 2, in which said last-named determination is based on the equation:

$$P = \frac{V_1 N_1}{F_1 A}$$

where $V_1$ = quantity flowing in the stream per unit time
$N_1$ = integrated detector response—net total counts
$F_1$ = detector characteristic, counts per unit time for a given concentration of radioactivity in the stream
P = fraction of component in stream measured
A = total quantity of radioactivity added to mixture or compound passing to separation zone.

4. A method according to claim 2, with the added step of introducing an activating material into said stream during the transit of said radioactive segment for rendering it effective to activate said detector.

5. A method according to claim 4, in which said detector is a scintillometer and said activating material is a scintillating liquid chosen from the group consisting of terphenyl, paraterphenyl, and 2,5-diphenyl oxazole.

6. A method of determining the distribution of a component of a mixture or compound between two streams from a process zone, comprising the steps of introducing into said zone with said mixture or compound a finite quantity of a radioactive material which is isotopic with said component, separating the processed mixture or compound into a first stream and a second stream each containing a radioactive segment proportional to said component, measuring the flow rate of said streams, introducing a scintillation liquid into each stream at a known constant rate of flow, detecting pulses in said streams due to the interaction of said radioactive segment and said scintillation liquid, integrating said pulses, and determining the proportions of said component in said streams according to the equation:

$$\frac{P_1}{P_2} = \frac{\frac{V_1 N_1}{F_1}}{\frac{V_2 N_2}{F_2}}$$

where

V = quantity flowing in the stream per unit time
N = integrated detector response (net total counts)
F = detector response, counts per unit time for a given concentration of radioactivity in the stream
$P_1$ = amount of component in first stream
$P_2$ = amount of component in second stream.

7. A method of determining the distribution of a component of a mixture or compound between two streams from a process zone, comprising the steps of introducing into said zone with said mixture or compound a finite quantity of a radioactive material which is isotopic with said component, separating said processed mixture or compound in said zone into a first stream and a second stream each containing a radioactive segment proportional to said component, mixing at least a part of each stream containing said segment with a scintillation liquid at a constant rate of flow, separately detecting pulses in said parts of streams due to the interaction of said segment sample and said scintillation liquid under comparable conditions, integrating said pulses to obtain the net total counts under said conditions, and determining the proportions of said component in said streams according to the equation:

$$\frac{P_1}{P_2} = \frac{V_1 N_1}{V_2 N_2}$$

where $P_1$ = amount of component in first stream
$P_2$ = amount of component in second stream
$V_1$ = flow rate of first stream
$V_2$ = flow rate of second stream
$N_1$ = total net counts from sample of first stream
$N_2$ = total net counts from sample of second stream.

8. A method according to claim 2, in which the component comprises a hydrocarbon and the radioactive isotope is chosen from the group consisting of carbon-14 and hydrogen-3.

9. A method of tracing a specific element in a stream which is passed through a process zone and separated into a plurality of separate streams, comprising the steps of introducing into said zone with said stream a specific quantity of a radioactive material which is isotopic with said element, measuring the flow rate of one of said separate streams, determining the response characteristic of a radiation detector to a known concentration of said radioactive isotope in said last-named stream, and determining the proportion of said element in said last-named stream by integrating the response of said detector to the transit of at least a part of said last-named stream and comparing it to the total quantity of radioactivity added to said first named stream.

10. A method according to claim 9, with the added step of introducing an activating material into that part of said last-named stream to which said detector responds, to render it effective to actuate said detector.

11. A method according to claim 10, in which said detector is a scintillometer and said activating material is effective to actuate said scintillometer in the presence of said radioactive isotope.

12. A method according to claim 9, in which the first-named stream comprises hydrocarbons and the radioactive isotope is chosen from the group consisting of carbon-14 and hydrogen-3.

References Cited in the file of this patent

UNITED STATES PATENTS 2,826,699   Hull _____ Mar. 11, 1958

OTHER REFERENCES

"Radioactive Isotopes as Tracers," by Kramer, Power Plant Engineering, Chicago, Illinois, November 1947, pages 105 to 108.

Haendler: Abstract of application Serial No. 631,420 published March 14, 1950 in Official Gazette, vol. 632, page 615 in class 250—43.